(12) United States Patent
Taguchi et al.

(10) Patent No.: US 11,172,097 B2
(45) Date of Patent: Nov. 9, 2021

(54) INFORMATION PROCESSING APPARATUS AND NON-TRANSITORY COMPUTER READABLE MEDIUM THAT ACQUIRE A PSYCHOLOGICAL STATE OF A USER

(71) Applicant: FUJIFILM BUSINESS INNOVATION CORP., Tokyo (JP)

(72) Inventors: Yusuke Taguchi, Kanagawa (JP); Yohei Makino, Kanagawa (JP); Akihiro Ishii, Kanagawa (JP); Shuhei Toda, Kanagawa (JP); Hiroyuki Mitsuhashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/023,869

(22) Filed: Sep. 17, 2020

(65) Prior Publication Data
US 2021/0250465 A1    Aug. 12, 2021

(30) Foreign Application Priority Data
Feb. 12, 2020   (JP) .............................. JP2020-021859

(51) Int. Cl.
*H04N 1/44* (2006.01)
*H04N 1/00* (2006.01)
*G06F 21/32* (2013.01)

(52) U.S. Cl.
CPC .............. *H04N 1/442* (2013.01); *G06F 21/32* (2013.01); *H04N 1/00424* (2013.01); *H04N 1/4433* (2013.01); *H04N 1/4446* (2013.01)

(58) Field of Classification Search
CPC .. H04N 1/442; H04N 1/4433; H04N 1/00424; H04N 1/4446; G06F 21/32
See application file for complete search history.

(56) References Cited

U.S. PATENT DOCUMENTS

| | | | |
|---|---|---|---|
| 9,819,830 B2 | 11/2017 | Miyazaki | |
| 2015/0278498 A1* | 10/2015 | Hong | G06F 21/32 340/5.82 |
| 2017/0116402 A1* | 4/2017 | Hirabayashi | G06F 21/32 |
| 2017/0269886 A1* | 9/2017 | Ozawa | G06F 21/608 |
| 2019/0212668 A1* | 7/2019 | Koike | G03G 15/5087 |
| 2019/0294807 A1* | 9/2019 | Takano | G06F 21/62 |
| 2019/0324700 A1* | 10/2019 | Sugiyama | G06F 3/1231 |

FOREIGN PATENT DOCUMENTS

JP   6222361 B2   11/2017

* cited by examiner

*Primary Examiner* — Juan M Guillermety
(74) *Attorney, Agent, or Firm* — Oliff PLC

(57) ABSTRACT

An information processing apparatus includes a processor. The processor is configured to acquire data, an instruction for a process in which the data are used, and biological information on a user who provides the instruction, and execute the process in accordance with a condition under which a time before the process is completed is shorter, when the biological information indicates that the user is in a specific psychological state, than a specific psychological state under a condition determined in advance.

20 Claims, 7 Drawing Sheets

INFORMATION PROCESSING APPARATUS AND NON-TRANSITORY COMPUTER READABLE MEDIUM THAT ACQUIRE A PSYCHOLOGICAL STATE OF A USER

CROSS-REFERENCE TO RELATED APPLICATIONS

This application is based on and claims priority under 35 USC 119 from Japanese Patent Application No. 2020-021859 filed Feb. 12, 2020.

BACKGROUND

(i) Technical Field

The present disclosure relates to an information processing apparatus and a non-transitory computer readable medium.

(ii) Related Art

There is a technique of changing a process in accordance with the psychological state of a user. Japanese Patent No. 6222361, for example, describes prohibiting calibration, which is executed regularly, when biological information indicating that a user is in a hurry is acquired.

SUMMARY

A condition under which it takes time before process completion is occasionally set for a process that uses data. In such a case, it takes time before process completion if such a condition is set, even if the user is in a hurry etc.

Aspects of non-limiting embodiments of the present disclosure relate to reducing the time before a process specified by a user is completed in the case where the user is in a specific psychological state, compared to the case where the process is executed under a condition determined in advance, irrespective of the psychological state of the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor, in which the processor is configured to acquire data, an instruction for a process in which the data are used, and biological information on a user who provides the instruction, and execute the process in accordance with a condition under which a time before the process is completed is shorter, when the biological information indicates that the user is in a specific psychological state, than a specific psychological state under a condition determined in advance.

BRIEF DESCRIPTION OF THE DRAWINGS

An exemplary embodiment of the present disclosure will be described in detail based on the following figures, wherein:

FIG. 4 illustrates an example of a screen transition at the time of log-in;

DETAILED DESCRIPTION

1. Configuration

Figure 1:
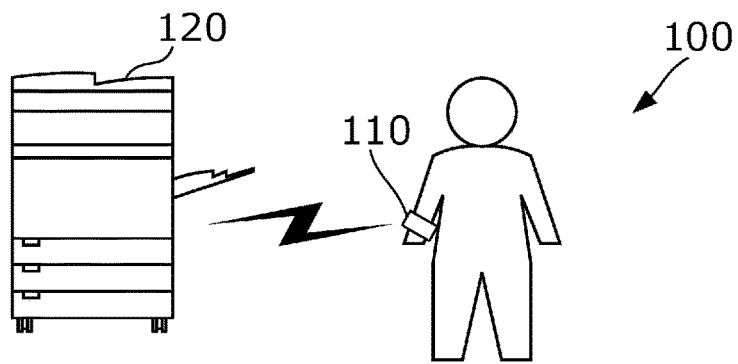
FIG. 1 illustrates an example of the configuration of an image processing system according to an exemplary embodiment.

FIG. 1 illustrates an example of the configuration of an image processing system 100 according to an exemplary embodiment. The image processing system 100 changes a condition for a process such that the time before a process specified by a user is completed is shortened in the case where the user is in a specific psychological state such as that in a hurry. The image processing system 100 includes a wearable terminal 110 and an image processing apparatus 120. The image processing apparatus 120 is an example of the information processing apparatus according to the present disclosure.

The wearable terminal 110 is mounted to the user, and measures biological information on the user. The wearable terminal 110 has the shape of a wristband mounted to an arm, for example, as illustrated in FIG. 1. However, the shape of the wearable terminal 110 is not limited to a wristband shape. For example, the shape of the wearable terminal 110 may be any shape such as the shape of a ring mounted to a finger, the shape of a clip attached to a garment, the shape of glasses mounted to the head, and a head-mount type. The wearable terminal 110 includes one or a plurality of sensors (not illustrated) that measure biological information. The biological information indicates a psychological state such as that in a hurry. The biological information includes a heart rate or a blood pressure, for example. In the case where the biological information includes a heart rate, for example, the wearable terminal 110 includes a heart rate meter that measures the heart rate. In the case where the biological information includes a blood pressure, the wearable terminal 110 includes a sphygmomanometer that measures the blood pressure. The wearable terminal 110 also includes a communication section (not illustrated). The communication section performs data communication with a different device in accordance with Bluetooth (registered trademark), for example. However, the communication standard which is employed by the communication section is not limited to Bluetooth (registered trademark), and may be a different communication standard. The wearable terminal 110 transmits the biological information from the communication section to the image processing apparatus 120, for example.

Figure 2:
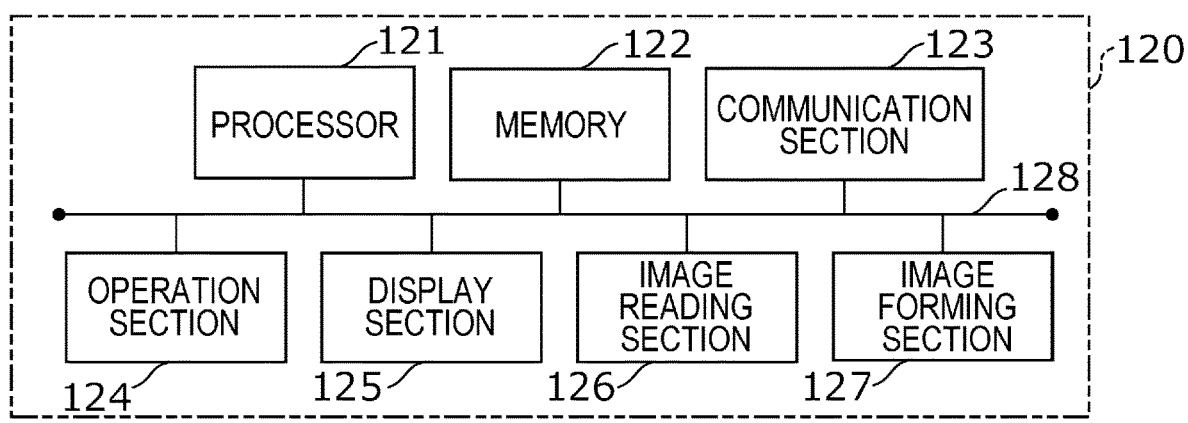
FIG. 2 illustrates an example of the configuration of an image processing apparatus.

FIG. 2 illustrates an example of the configuration of the image processing apparatus 120. The image processing apparatus 120 has a plurality of functions to process an image, such as a copy function, a print function, a scan function, and a facsimile function. The image processing apparatus 120 performs a process that implements such functions. A process condition is set in advance for each process. The process condition may include one setting value, or may include a combination of a plurality of setting values. The image processing apparatus 120 includes a processor 121, a memory 122, a communication section 123, an operation section 124, a display section 125, an image reading section 126, and an image forming section 127. Such sections are connected to each other via a bus 128.

The processor 121 controls the various sections of the image processing apparatus 120 or performs various processes by executing a program. The processor 121 is a central processing unit (CPU), for example. The memory 122 stores a program to be executed by the processor 121. The memory 122 is a read only memory (ROM) and a random access memory (RAM), for example. The memory 122 may also be a hard disk drive or a solid state drive (SSD), for example, in addition to the ROM and the RAM. The memory 122 stores a plurality of application programs (hereinafter referred to as "apps") that achieve the plurality of functions of the image processing apparatus 120. Examples of the plurality of apps include a copy app that achieves the copy function, a print app that achieves the print function, a scan app that achieves the scan function, and a facsimile app that achieves the facsimile function. The communication section 123 performs data communication with a different device connected via a communication line. The communication line may be a wired communication line, or may be a wireless communication line. Examples of the communication standard which is employed by the communication section 123 include Bluetooth (registered trademark). The operation section 124 is used by the user to operate the image processing apparatus 120. Examples of the operation section 124 include a touch screen and keys. The display section 125 displays various types of information. The display section 125 is a liquid crystal display, for example. The image reading section 126 reads an image, and converts the image into image data. The image reading section 126 is an image scanner, for example. The image forming section 127 forms an image that matches image data on a medium such as paper. The image forming section 127 is a printer, for example.

2. Operation

In the case where the processor 121 is indicated as the subject of a process in the following description, it is meant that the process is performed by the processor 121 performing computation or controlling operation of other hardware elements through cooperation of the program which is stored in the memory 122 and the processor 121 which executes the program.

Figure 3:
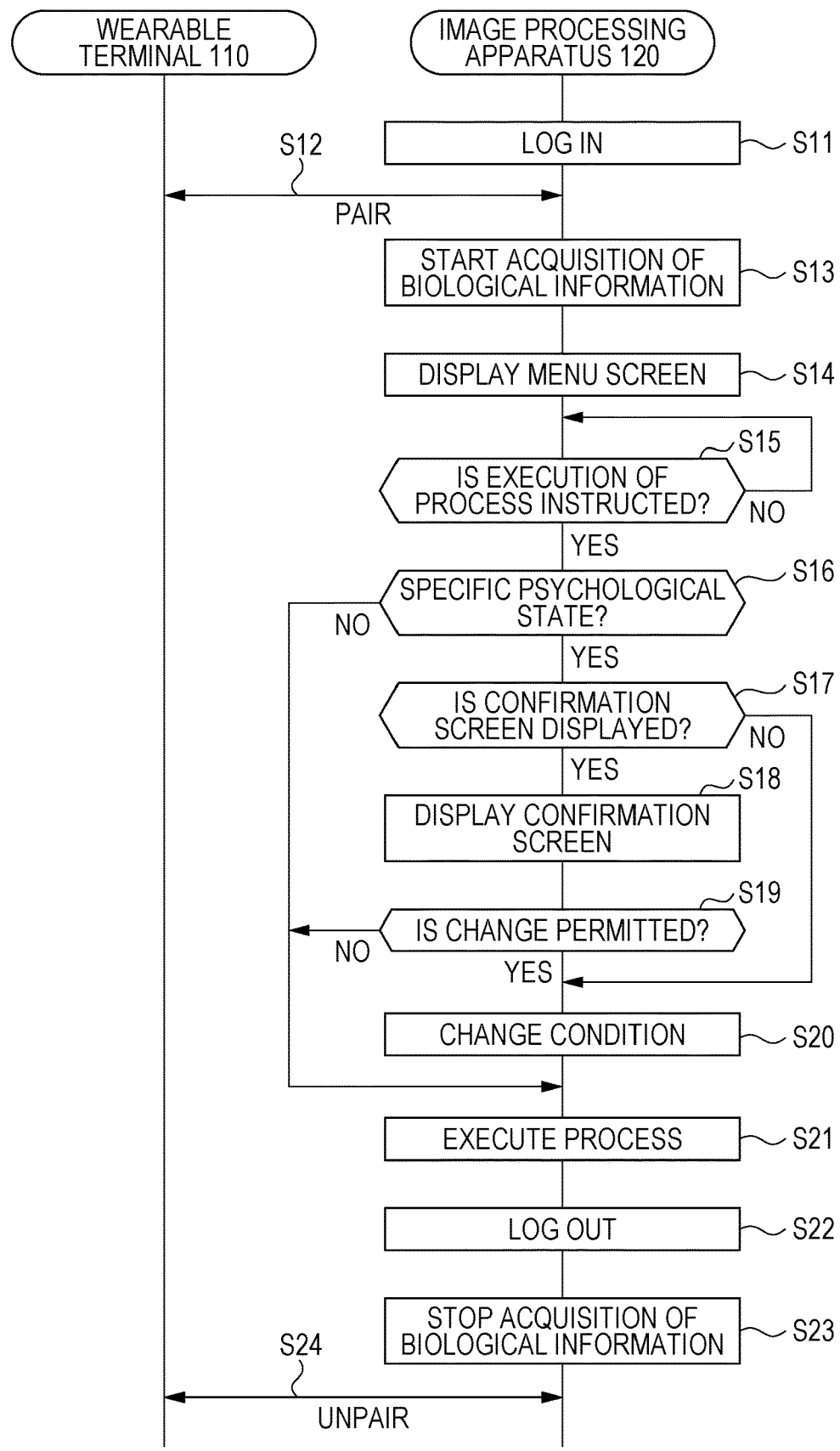
FIG. 3 is a sequence chart illustrating an example of operation performed by the image processing system.

FIG. 3 is a sequence chart illustrating an example of operation performed by the image processing system 100. This operation is performed when the user utilizes the image processing apparatus 120. In step S11, the user logs in to the image processing apparatus 120. The processor 121 of the image processing apparatus 120 authenticates the user who has logged in.

Figure 4:
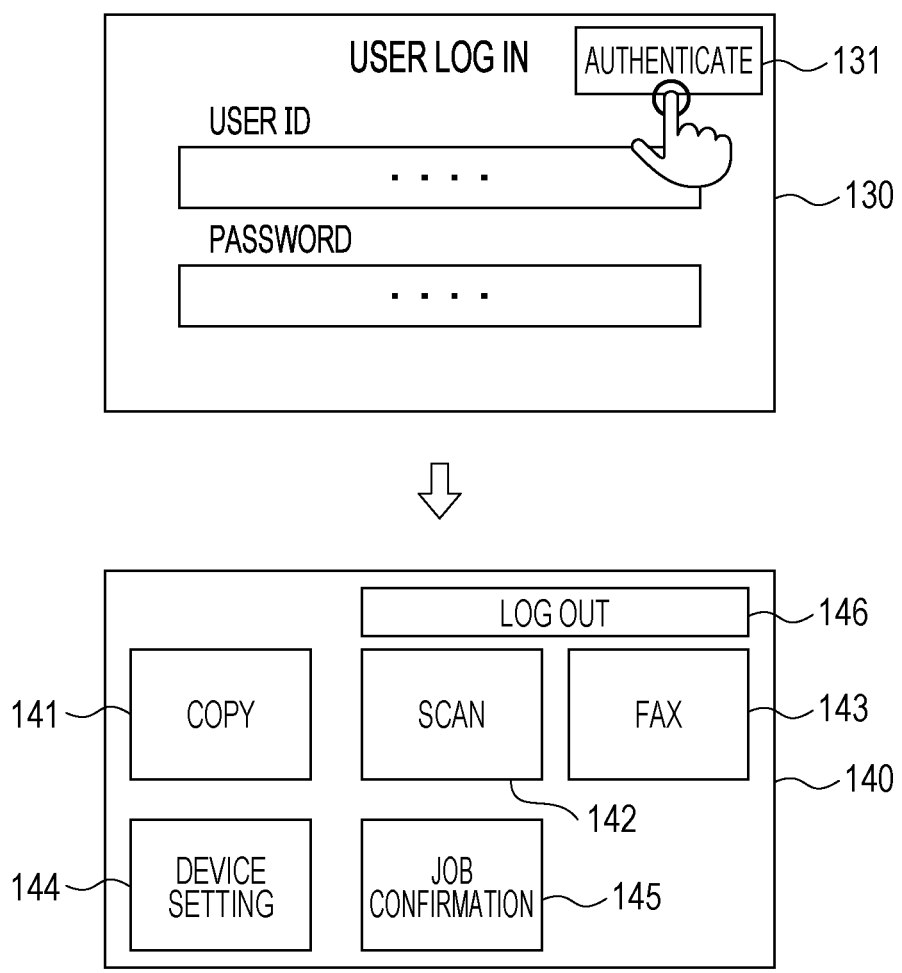

FIG. 4 illustrates an example of a screen transition at the time of log-in. The display section 125 displays a log-in screen 130. The user performs an operation to input his/her user ID and password to the log-in screen 130 using the operation section 124. Subsequently, the user performs an operation to press an authentication button 131 included in the log-in screen 130. The processor 121 authenticates the user using the user ID and the password which are input by the user. When the user is successfully authenticated, the process proceeds to step S12. In the case where the user is not successfully authenticated, the process is ended.

In step S12, the processor 121 pairs the image processing apparatus 120 with the wearable terminal 110 of the user. At this time, first, the wearable terminal 110 of the user is specified. For example, the user ID of the user is correlated with a terminal ID of the wearable terminal 110 of the user in advance. A terminal ID correlated with the user ID which is input in step S11 is specified, and the wearable terminal 110 corresponding to the specified terminal ID is specified as the wearable terminal 110 of the user. Subsequently, the image processing apparatus 120 is paired with the specified wearable terminal 110 in accordance with Bluetooth (registered trademark). Consequently, the image processing apparatus 120 and the wearable terminal 110 of the user are wirelessly connected to each other. While the image processing apparatus 120 is paired with one wearable terminal 110, the image processing apparatus 120 is not paired with a different wearable terminal 110.

In step S13, the processor 121 starts acquisition of biological information from the wearable terminal 110. For example, the processor 121 transmits, from the communication section 123, a request to acquire biological information to the wearable terminal 110 which is paired in step S12. The wearable terminal 110 transmits biological information measured from the user to the image processing apparatus 120 in response to this acquisition request. The wearable terminal 110 receives, at the communication section 123, the biological information which is transmitted from the wearable terminal 110. Acquisition of biological information is started when the user logs in, and repeatedly performed at time intervals determined in advance.

In step S14, when the user logs in to the image processing apparatus 120, the processor 121 displays a menu screen 140 on the display section 125. The menu screen 140 is used by the user to perform an operation to select a desired function from the plurality of functions of the image processing apparatus 120. As illustrated in FIG. 4, the menu screen 140 includes select buttons 141 to 145 that are used to receive an operation to select the various functions of the image processing apparatus 120. To use the facsimile function, for example, the user performs an operation to press the select button 143 corresponding to the facsimile function. The facsimile app is started in response to this operation.

In step S15, the processor 121 determines whether or not execution of a process is instructed. This determination is made in accordance with whether or not the user performs an operation to instruct execution of a process. In the case where an operation to instruct execution of a process is not performed, the determination in step S15 is NO. In this case, the determination in step S15 is repeatedly made. In the case where an operation to instruct execution of a process is performed, on the other hand, the determination in step S15 is YES. In this case, an instruction to execute a process and data to be used in the process are acquired, and the process proceeds to step S16.

Figure 5:
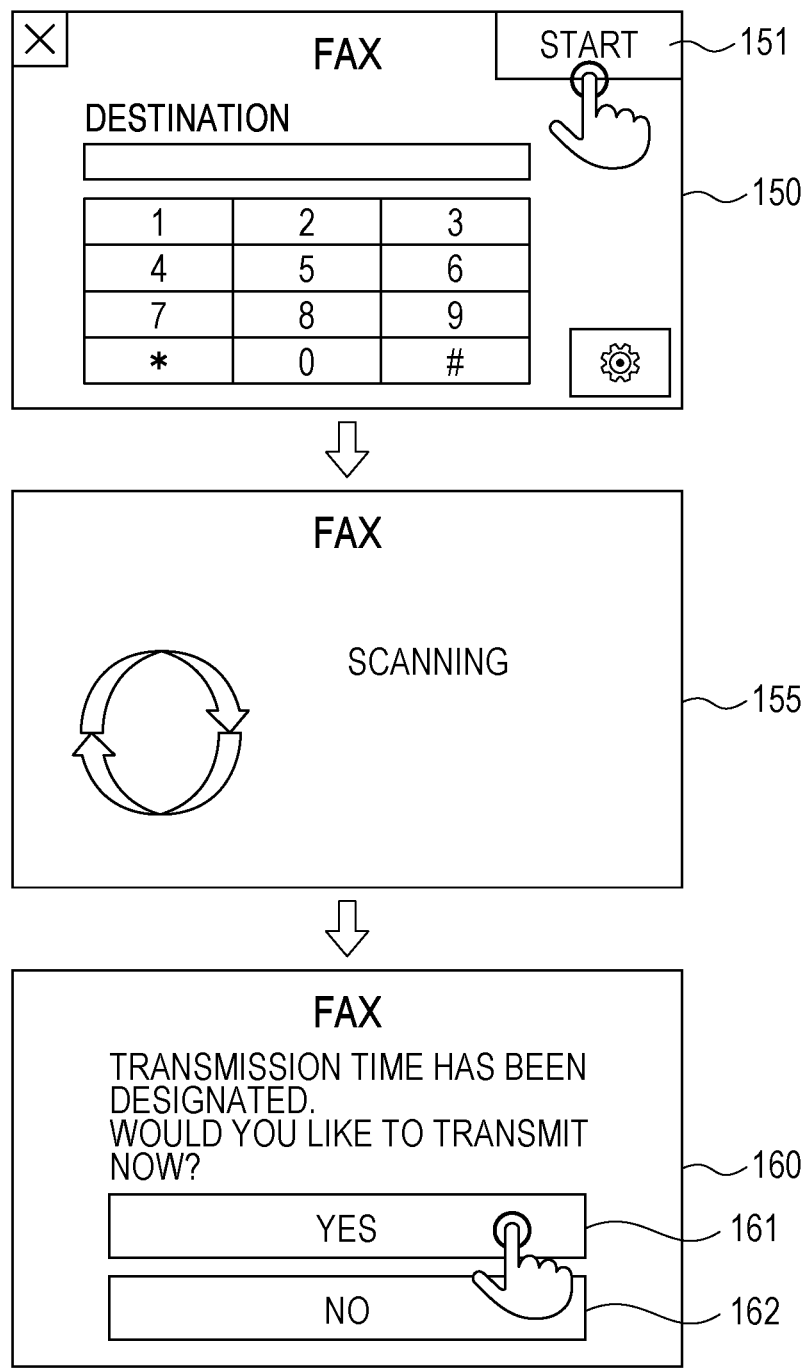
FIG. 5 illustrates an example of screen transitions displayed when a facsimile app is started.

FIG. 5 illustrates an example of screen transitions displayed when the facsimile app is started. When the facsimile app is started, a facsimile screen 150 is displayed. The facsimile screen 150 includes a start button 151. The start button 151 receives an operation to instruct execution of a facsimile process. To instruct execution of the facsimile function, for example, the user performs an operation to press the start button 151. When this operation is performed, the determination in step S15 is YES, and the process proceeds to step S16.

In step S16, the processor 121 determines whether or not the user is in a specific psychological state by analyzing the biological information which is acquired from the wearable terminal 110. The specific psychological state is a psychological state indicating that the user is in a hurry, for example. This determination is made in accordance with whether or not the biological information indicates that the user is in the specific psychological state. In the case where the biological information includes a heart rate or a blood pressure, for example, it is determined that the user is in the specific psychological state if the heart rate or the blood pressure is equal to or more than a threshold value. The threshold value is set in advance to a heart rate or a blood pressure measured when a person is in a hurry, for example. In the case where it is determined that the user is in the specific psychological state, the determination in step S16 is YES, and the process proceeds to step S17.

In step S17, the processor 121 determines whether or not to display a confirmation screen 160 for confirming whether or not to permit a change in a process condition. In the case where a manager has made setting in advance to display the confirmation screen 160, for example, the determination in step S17 is YES, and the process proceeds to step S18.

In step S18, the processor 121 displays the confirmation screen 160 on the display section 125. The confirmation screen 160 receives an operation that indicates whether or not to permit a change in a process condition. This allows the user to determine whether or not to permit a change in the process condition, since it is considered that the user may be in trouble if the process change is changed not via an operation by the user. That is, whether or not to change the process condition is controlled in accordance with an operation received on the confirmation screen 160.

If execution of the facsimile process is instructed in step S15 discussed above, for example, an image of a document is read by the image reading section 126 to obtain image data that indicate the image. When reading of an image of a document is started, a notification screen 155 indicating that an image of a document is being read is displayed as illustrated in FIG. 5. In this case, when reading of the image is completed, a confirmation screen 160 is displayed as illustrated in FIG. 5. The facsimile process has been set in advance so as to transmit a facsimile at a designated time. In this case, the confirmation screen 160 includes a message that asks whether or not to transmit the facsimile immediately, rather than to transmit the facsimile at the designated time. The confirmation screen 160 also includes a button 161 to receive an operation to permit a change in setting such that the facsimile is transmitted immediately, and a button 162 to receive an operation to reject such a change in setting. To permit a change in setting such that the facsimile is transmitted immediately, the user performs an operation to press the button 161.

In step S19, the processor 121 determines whether or not a change to the process condition is permitted. This determination is made in accordance with whether or not an operation to permit a change to the process condition is performed on the confirmation screen 160, for example. If the button 161 is pressed on the confirmation screen 160 illustrated in FIG. 5, for example, the determination in step S19 is YES, and the process proceeds to step S20.

In the case where the manager has made setting in advance not to display the confirmation screen 160, for example, in step S17 discussed above, meanwhile, the determination in step S17 is NO. In this case, the process proceeds to step S20 by skipping the processes in steps S18 and S19.

In step S20, the processor 121 changes the process condition such that the time before the process is completed becomes shorter than that under a condition determined in advance. The condition determined in advance may be an initially set condition, or may be a condition determined in advance by the manager or the user, for example.

A facsimile process in which the time to transmit a facsimile is set in advance to 21 o'clock, for example, is assumed. The time is later than the time at which execution of the process is instructed, and is determined in advance by the manager, for example. In this case, setting is changed such that a facsimile is transmitted immediately. This change causes the process to be started when execution of the process is instructed. Therefore, the time required before the process is started since execution of the process is instructed becomes shorter than that under a condition determined in advance.

A facsimile process in which setting is made in advance to display a preview screen 170 before transmission of a facsimile is assumed as another example. The preview screen 170 displays the content of a facsimile. In addition, the preview screen 170 receives an operation to instruct transmission of a facsimile. A facsimile is transmitted when this operation is performed. In this case, setting is changed such that the preview screen 170 is not displayed before transmission of a facsimile. This change hides the preview screen 170, and causes transmission of a facsimile even if there is no operation to instruct transmission of a facsimile. In this case, the number of screen transitions displayed before the process is started is reduced, and the number of operation procedures required before the process is started is reduced. Therefore, the time required before the process is started since execution of the process is instructed becomes shorter than that with the setting determined in advance.

In step S21, the processor 121 executes the process in accordance with the condition determined in advance or the condition changed in step S20. In the case where the condition for the process is changed in step S20, for example, the process is executed in accordance with the condition after the change.

Figure 6:
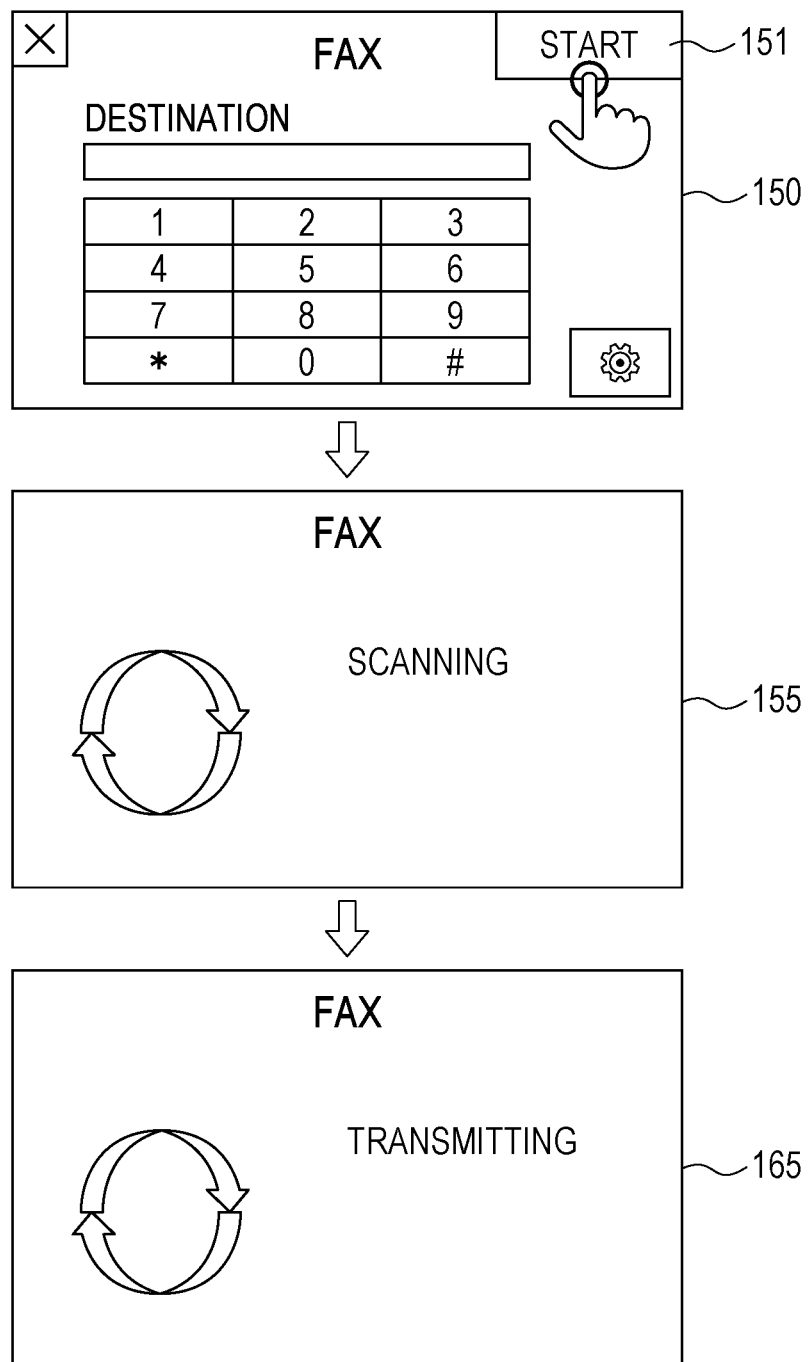
FIG. 6 illustrates an example of screen transitions for a case where a facsimile process is executed in accordance with changed setting.

FIG. 6 illustrates an example of screen transitions for a case where the facsimile process is executed in accordance with setting changed such that a facsimile is transmitted immediately. In the example illustrated in FIG. 6, display of the confirmation screen 160 is not illustrated. When an operation to instruct execution of the facsimile process is performed on the facsimile screen 150, an image of a document is read to obtain image data. When reading of an image of a document is started, a notification screen 155 indicating that an image of a document is being read is displayed. In the case where the facsimile process is performed in accordance with the setting determined in advance, image data are not transmitted before 21 o'clock, even if image data on the document are obtained, since the setting designates the time to transmit a facsimile as 21 o'clock. If setting is changed such that a facsimile is transmitted immediately, on the other hand, image data are transmitted immediately when image data are obtained by reading an image of a document. That is, the time required before the facsimile process is started since execution of the facsimile process is instructed is shortened by changing the setting determined in advance. When transmission of the image data is started, a notification screen 165 indicating that the image data are being transmitted is displayed as illustrated in FIG. 6.

Figure 7:
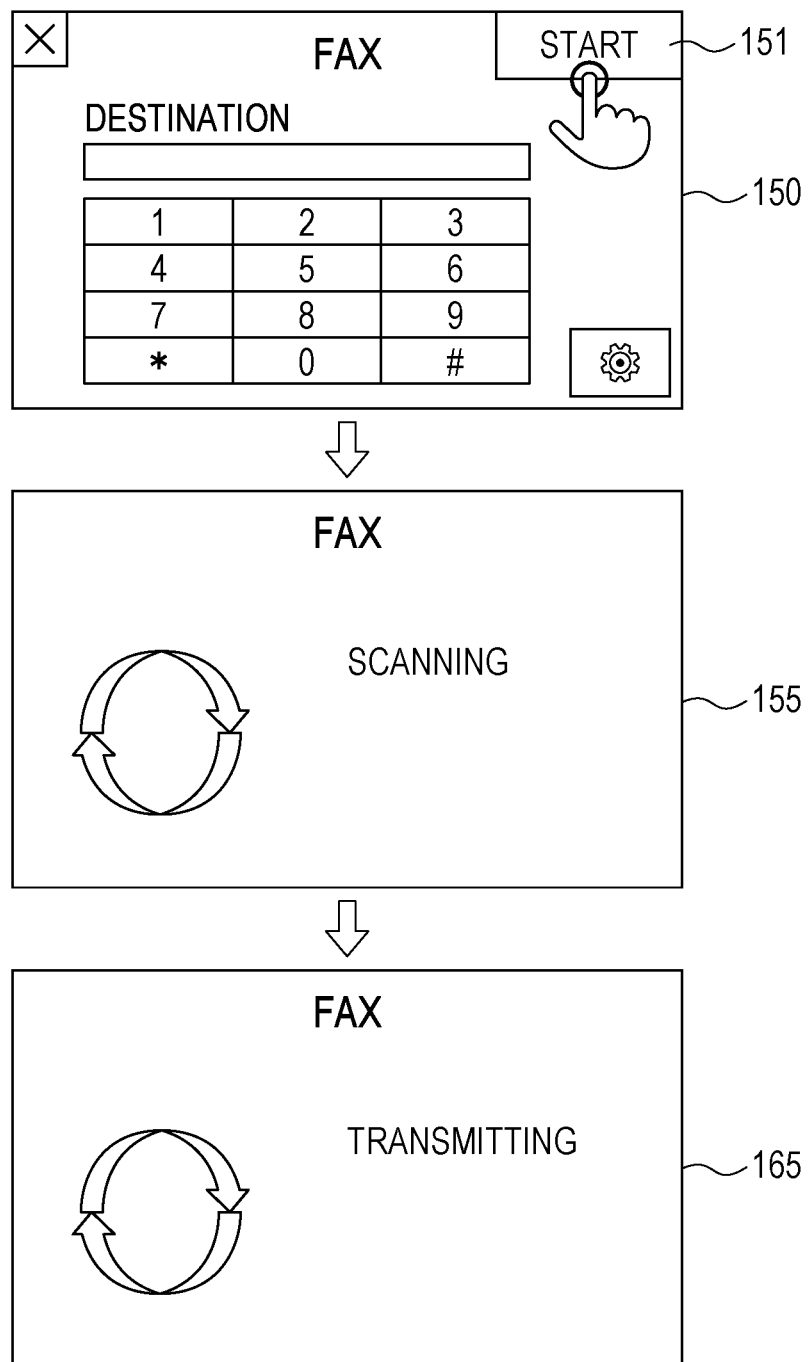
FIG. 7 illustrates an example of screen transitions for a case where the facsimile process is executed in accordance with changed setting.
Figure 8:
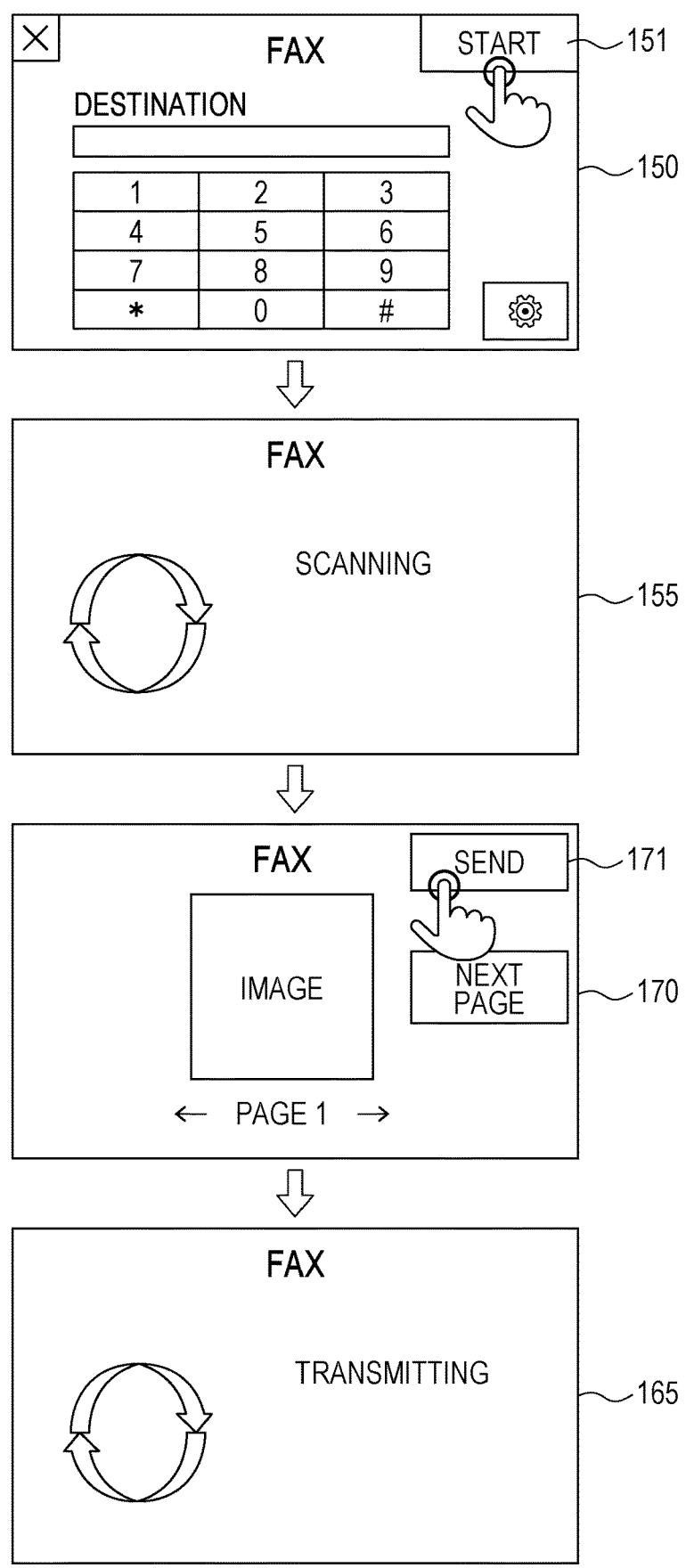
FIG. 8 illustrates an example of screen transitions for a case where the facsimile process is executed in accordance with setting determined in advance.

FIG. 7 illustrates an example of screen transitions for a case where the facsimile process is executed in accordance with setting changed such that the preview screen 170 is not displayed before transmission of a facsimile. In the example illustrated in FIG. 7, display of the confirmation screen 160 is not illustrated. When an operation to instruct execution of the facsimile process is performed on the facsimile screen 150, an image of a document is read to obtain image data. When reading of an image of a document is started, a notification screen 155 indicating that an image of a document is being read is displayed. In the case where the facsimile process is performed in accordance with the setting determined in advance, it is determined that the preview screen 170 is displayed before transmission of a facsimile. Therefore, when reading of an image of a document is completed, the preview screen 170 is displayed to allow confirmation of an image to be transmitted via facsimile as illustrated in FIG. 8. The preview screen 170 includes a transmit button 171 that receives an operation to instruct transmission of the image data, besides a read image of the document. When the user performs an operation to press the transmit button 171, the image data are transmitted. If setting is changed such that the preview screen 170 is not displayed before transmission of a facsimile, on the other hand, the image data are transmitted immediately without displaying the preview screen 170 illustrated in FIG. 8. In the example illustrated in FIG. 7, the number of screen transitions displayed since execution of the facsimile process is instructed before transmission of a facsimile is started is reduced by one compared to the example illustrated in FIG. 8. In addition, while an operation to press the transmit button 171 needs to be performed in order to transmit a facsimile in the example illustrated in FIG. 8, a facsimile is transmitted even if such an operation is not performed in the example illustrated in FIG. 7. Thus, in the example illustrated in FIG. 7, the number of operation procedures required since execution of the facsimile process is instructed before transmission of a facsimile is started is reduced by one compared to the example illustrated in FIG. 8. In this manner, the number of screen transitions displayed before the facsimile process is started is reduced, and the number of operation procedures required before the facsimile process is started is reduced, by changing the setting determined in advance. When transmission of the image data is started, a notification screen 165 indicating that the image data are being transmitted is displayed as illustrated in FIG. 7.

In the case where it is determined in step S16 discussed above that the user is not in the specific psychological state, on the other hand, the determination in step S16 is NO, and the process proceeds to step S21 by skipping the processes in S17 to S20. In the case where it is determined in step S19 discussed above that a change to the process condition is not permitted, in addition, the determination in step S19 is NO, and the process proceeds to step S21 by skipping the process in S20. In these cases, the process is executed in accordance with the condition determined in advance in step S21. For example, in a facsimile process in which the time to transmit a facsimile is set in advance to 21 o'clock, for example, image data on a document is temporarily stored in the memory 122. Then, the image data are transmitted when it is 21 o'clock. In a facsimile process in which setting is made in advance such that the preview screen 170 is displayed before transmission of a facsimile, the preview screen 170 is displayed when reading of an image of a document is completed as illustrated in FIG. 8. Then, image data are transmitted when the transmit button 171 is pressed on the preview screen 170.

When the user logs out from the image processing apparatus 120 in step S22, the processor 121 finishes the acquisition of biological information in step S23. Then, in step S24, the processor 121 unpairs the image processing apparatus 120 from the wearable terminal 110. When the process is completed, for example, the menu screen 140 illustrated in FIG. 4 is displayed. The menu screen 140 includes a log-out button 146 that receives a log-out operation. When the user performs an operation to press the log-out button 146, the acquisition of biological information is finished, and the image processing apparatus 120 is unpaired from the wearable terminal 110.

In the exemplary embodiment described above, in the case where the user is in the specific psychological state, the process condition is changed such that the time before the process is completed becomes shorter than that under a condition determined in advance. In the case where the user is in the specific psychological state, in addition, setting for the facsimile process is changed such that a facsimile is transmitted immediately, even if setting has been made in advance to transmit a facsimile at 21 o'clock. Therefore, the process is started at the time when an instruction for the process is acquired.

In the case where the user is in the specific psychological state, further, setting for the facsimile process is changed such that the preview screen 170 is not displayed before transmission of a facsimile, even if setting has been made in advance to display the preview screen 170 before transmission of a facsimile. Further, in the case where the confirmation screen 160 is displayed, the user is allowed to determine whether or not to permit a change to the condition determined in advance.

3. Modifications

The exemplary embodiment discussed above is an example of the present disclosure. The present disclosure is not limited to the exemplary embodiment discussed above. The exemplary embodiment discussed above may be modified as in the following examples to be implemented. Two or more of the following modifications may be combined with each other.

In the exemplary embodiment discussed above, even if setting has been made in advance such that a screen related to a second process that follows a first process is displayed before the start of the first process and the first process is started when an operation determined in advance is performed on the screen in the case where the psychological state of the user is the specific psychological state, the setting may be changed such that the screen is hidden and the first process is started without the operation. For example, the facsimile process is occasionally configured such that a confirmation screen for confirming whether or not to read the next document is displayed when one document is read and a process of transmitting image data is started when an operation to indicate that the next document is not read is performed on the confirmation screen. In the case where setting has been made in advance to display the confirmation screen in the facsimile process, for example, the setting may be changed not to display the confirmation screen. When the setting is changed in this manner, the number of screen transitions displayed before the facsimile process is started is reduced by one, and the number of operation procedures required before the facsimile process is started is reduced by one, compared to the case where the process is executed in accordance with the setting determined in advance.

In the exemplary embodiment discussed above, even if setting has been made in advance such that a process is started with no operation when a first time elapses with no operation performed to start the process in the case where the psychological state of the user is the specific psychological state, the setting may be changed such that the process is started when a second time which is shorter than the first time elapses. For example, a time-out time is occasionally set for the preview screen 170 illustrated in FIG. 8. On the preview screen 170, an operation to press the transmit button 171 basically starts a process of transmitting a facsimile. When the time-out time elapses with no operation performed on the preview screen 170, however, a process of transmitting a facsimile is executed even if the transmit button 171 is not pressed on the preview screen 170. In the case where the time-out time for the preview screen 170 is set to one minute, for example, the time-out time may be changed to a time that is shorter than one minute, e.g. ten seconds. When the time-out time is changed to ten seconds, a process of transmitting a facsimile is executed, even if the transmit button 171 is not pressed, when ten seconds elapse with no operation performed on the preview screen 170. If the setting is changed in this manner, the time-out time becomes shorter. Therefore, the time required before the facsimile process is started since execution of the facsimile process is instructed is shortened when there is no operation to instruct transmission of a facsimile, compared to the case where the process is executed in accordance with the time-out time before the change.

In the exemplary embodiment discussed above, in the case where the psychological state of the user is the specific psychological state and when only one piece of data is stored in a recording medium, a screen for receiving an operation to select one piece of data from among one or more pieces of data stored in a recording medium may not be displayed and a process may be started using the one piece of data stored in the recording medium with no operation to select data, even if setting has been made in advance to display such a screen and start a process when the screen receives an operation to select data. For example, the print function includes a function to print data stored in a universal serial bus (USB) memory. To print data stored in a USB memory, normally, a list screen that indicates a list of the data stored in the USB memory is displayed, and selected data are printed when an operation to select data is performed on the list screen. In this case, the operation to select data starts a print process. Even if setting has been made in advance to display a list screen, the setting may be changed such that the list screen is not displayed in the case where the psychological state of the user is the specific psychological state and when only one piece of data is stored in the USB memory. In this case, the data stored in the USB memory are printed even if an operation to select data is not performed. When the setting is changed in this manner, the number of screen transitions displayed before the print process is started is reduced by one, and the number of operation procedures required before the print process is started is reduced by one, compared to the case where the process is executed in accordance with the setting determined in advance.

In the exemplary embodiment discussed above, the process, the setting for which is to be changed, is not limited to the facsimile process. For example, the setting for the scan process or the print process may be changed. In some cases, setting has been made in advance to display a preview screen before execution of a process also for the scan process or the print process. In such cases, the setting may be changed such that a preview screen is not displayed before the process. In other cases, setting has been made in advance to display a screen for confirming whether or not to read the next document when reading of one document is completed also for the scan process or the print process, for example. In this case, the setting may be changed such that this screen is not displayed. In still other cases, a time-out time is set also for the scan process or the print process, for example. In such cases, the setting may be changed so as to shorten the time-out time.

In the exemplary embodiment discussed above, the process condition is not limited to the example described in relation to the exemplary embodiment. The condition may be any condition that is determined in advance for a process and that shortens the time before the process is completed by changing the condition. For example, in the case where an image resolution is determined in advance for the scan process, the print process, or the facsimile process, the resolution may be reduced. In the case where setting has been made in advance for the print process to form one page image on one surface of a medium, further, the setting may be changed so as to form a plurality of page images on one surface of a medium.

In the exemplary embodiment discussed above, the confirmation screen 160 may be displayed and a change to a condition may be controlled in accordance with an operation received on the confirmation screen 160 in the case where the user is in a first specific psychological state, and the confirmation screen 160 may be hidden and a condition may be changed even if the confirmation screen 160 is not operated in the case where the user is in a second specific psychological state. For example, the confirmation screen 160 may not be displayed in the case where it is determined by analyzing biological information that the user is in a great hurry, and the confirmation screen 160 may be displayed in the case where it is determined that the user is in a slight hurry. For example, it may be determined that the user is in a great hurry when his/her heart rate or blood pressure is equal to or more than a first threshold, and it may be determined that the user is in a slight hurry when his/her heart rate or blood pressure is equal to or more than a second threshold that is less than the first threshold. Consequently, in the case where the user is in a great hurry, the confirmation screen 160 is not displayed, and therefore the process is executed even if an operation is not performed using the confirmation screen 160. In the case where the user is in a slight hurry, on the other hand, the confirmation screen 160 is displayed, and therefore the user is allowed to determine whether or not to permit a change to a condition. Thus, it may be changed, in accordance with the psychological state of the user, whether or not to confirm whether or not the user permits a change to a condition determined in advance.

In the exemplary embodiment discussed above, the timing to determine whether or not the user is in a specific psychological state is not limited to the time after execution of a process is instructed. For example, it may be determined whether or not the user is in a specific psychological state each time biological information is acquired in a period after biological information is acquired. In this case, the determination in step S16 may be YES in the case where it is determined at least once in such a period that the user is in a specific psychological state. Alternatively, the determination in step S16 may be YES in the case where it is determined a predetermined number of times or more, or a predetermined number of times or more consecutively, in such a period that the user is in a specific psychological state.

In the exemplary embodiment discussed above, it is not necessary that acquisition of biological information should be started when the user logs in. For example, acquisition of biological information may be started when an app is started on the image processing apparatus 120.

In the exemplary embodiment discussed above, in the case where the user is not authenticated by the image processing apparatus 120, the processor 121 may detect the wearable terminal 110 that is the closest to the image processing apparatus 120 at the timing when the user uses the image processing apparatus 120, and pair the image processing apparatus 120 with the detected wearable terminal 110. This timing may be the time when the image processing apparatus 120 returns from a power-saving mode in the case where the image processing apparatus 120 has a power-saving mode, or may be the time when the image processing apparatus 120 is started, for example. In this case, in addition, the processor 121 may unpair the image processing apparatus 120 from the wearable terminal 110 at the timing when the user does not use the image processing apparatus 120 any more. This timing may be the time when the image processing apparatus 120 transitions to a power-saving mode in the case where the image processing apparatus 120 has a power-saving mode, for example.

In the exemplary embodiment discussed above, the specific psychological state is not limited to a state in a hurry. The specific psychological state may be any psychological state that makes one desire that the time before completion of a process should be shortened, such as a pressed state and a tensed state. In addition, the biological information is not limited to a heart rate or a blood pressure, and may be any biological information that indicates the psychological state of the user.

In the exemplary embodiment discussed above, a different processing apparatus may be used in place of the image processing apparatus 120. For example, the processing apparatus may include any information processing apparatus such as a home electric appliance, an audio device, and a computer. The process performed by the processing apparatus is not limited to a process in which image data are used. The process performed by the processing apparatus may be any process performed using data in accordance with a condition.

The subjects of the processes in the image processing system 100 according to the exemplary embodiment discussed above are exemplary, and are not limited to such examples. For example, at least some of the processes performed by the image processing apparatus 120 may be performed by a different device. For example, there may be a case where the image processing apparatus 120 and a terminal apparatus are connected to each other via a communication line and an instruction for a print process is transmitted from the terminal apparatus to the image processing apparatus 120. In this case, the terminal apparatus may perform the processes in steps S12 to S20 discussed above. In addition, the processes in the image processing system 100 according to the exemplary embodiment discussed above are exemplary, and may be reordered unless any contradiction occurs.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The present disclosure may be provided as a program to be executed by each of the image processing apparatus 120 and the wearable terminal 110. The image processing apparatus 120 and the wearable terminal 110 are each an example of the computer according to the present disclosure. The program may be downloaded via a communication line such as the Internet, and may be provided as recorded in a computer-readable recording medium such as a magnetic recording medium (such as a magnetic tape and a magnetic disk), an optical recording medium (such as an optical disc), a magneto-optical recording medium, and a semiconductor memory.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire data, an instruction for a process in which the data are used, and biological information on a user who provides the instruction;
execute the process in a first time, when the biological information indicates that the user is not in a specific psychological state; and
execute the process in a second time, when the biological information indicates that the user is in the specific psychological state,
wherein the second time is shorter than the first time.

2. The information processing apparatus according to claim 1, wherein the processor is configured to start the process under a condition under which a time required before the process is started since the instruction for the process is provided is shorter than that under the condition determined in advance.

3. The information processing apparatus according to claim 2, wherein, in a case where the condition determined in advance indicates that the process is started at a determined time that is later than a time when the instruction for the process is acquired, the processor is configured to start the process under a condition under which the process is started at a time that matches acquisition of the instruction for the process.

4. The information processing apparatus according to claim 2, wherein, in a case where the condition determined in advance indicates that the process is started, even without an operation to start the process, when a first time elapses without the operation performed, the processor is configured to start the process when a second time that is shorter than the first time elapses without the operation performed.

5. The information processing apparatus according to claim 2, wherein the processor is configured to
display, on a display section, a screen for receiving an operation that indicates whether or not to permit a change to the condition, and control whether or not to execute the process in accordance with the condition in response to the operation received on the screen.

6. The information processing apparatus according to claim 1, wherein the processor is configured to execute the process under a condition under which a number of operation procedures required before the process is started is reduced compared to a number of operation procedures under the condition determined in advance.

7. The information processing apparatus according to claim 6, wherein the processor is configured to execute the process under a condition under which a number of screen transitions displayed on a display section before the process is started is reduced compared to a number of screen transitions under the condition determined in advance.

8. The information processing apparatus according to claim 7, wherein, in a case where the condition determined in advance indicates that a screen that represents a content of the process is displayed on a display section before the process is started and that the process is started when an operation determined in advance is performed on the screen, the processor is configured to hide the screen and start the process even without the operation.

9. The information processing apparatus according to claim 7, wherein, in a case where the condition determined in advance indicates that a screen related to a different process that follows the process is displayed on a display section before the process is started and that the process is started when an operation determined in advance is performed on the screen, the processor is configured to hide the screen and start the process even without the operation.

10. The information processing apparatus according to claim 7, wherein the processor is configured to
acquire one piece of data stored in a recording medium, and
in a case where the condition determined in advance indicates that a screen for receiving an operation to select the one piece of data from one or more pieces of data stored in the recording medium is displayed on a display section and that the process is started when the screen receives the operation, hide the screen and start the process using the one piece of data even without the operation.

11. The information processing apparatus according to claim 6, wherein, in a case where the condition determined in advance indicates that a screen that represents a content of the process is displayed on a display section before the process is started and that the process is started when an operation determined in advance is performed on the screen, the processor is configured to hide the screen and start the process even without the operation.

12. The information processing apparatus according to claim 6, wherein, in a case where the condition determined in advance indicates that a screen related to a different process that follows the process is displayed on a display section before the process is started and that the process is started when an operation determined in advance is performed on the screen, the processor is configured to hide the screen and start the process even without the operation.

13. The information processing apparatus according to claim 6, wherein the processor is configured to
acquire one piece of data stored in a recording medium, and
in a case where the condition determined in advance indicates that a screen for receiving an operation to select the one piece of data from one or more pieces of data stored in the recording medium is displayed on a display section and that the process is started when the screen receives the operation, hide the screen and start the process using the one piece of data even without the operation.

14. The information processing apparatus according to claim 1, wherein the processor is configured to execute the process under a condition under which a number of screen transitions displayed on a display section before the process is started is reduced compared to a number of screen transitions under the condition determined in advance.

15. The information processing apparatus according to claim 14, wherein, in a case where the condition determined in advance indicates that a screen that represents a content of the process is displayed on a display section before the process is started and that the process is started when an operation determined in advance is performed on the screen, the processor is configured to hide the screen and start the process even without the operation.

16. The information processing apparatus according to claim 14, wherein, in a case where the condition determined in advance indicates that a screen related to a different process that follows the process is displayed on a display section before the process is started and that the process is started when an operation determined in advance is performed on the screen, the processor is configured to hide the screen and start the process even without the operation.

17. The information processing apparatus according to claim 14, wherein the processor is configured to
acquire one piece of data stored in a recording medium, and
in a case where the condition determined in advance indicates that a screen for receiving an operation to select the one piece of data from one or more pieces of data stored in the recording medium is displayed on a display section and that the process is started when the screen receives the operation, hide the screen and start the process using the one piece of data even without the operation.

18. The information processing apparatus according to claim 1, wherein the processor is configured to
display, on a display section, a screen for receiving an operation that indicates whether or not to permit a change to the condition, and
control whether or not to execute the process in accordance with the condition in response to the operation received on the screen.

19. The information processing apparatus according to claim 18, wherein the processor is configured to
display the screen and perform the control in response to the operation received on the screen when the biological information indicates that the user is in a first specific psychological state, and
hide the screen and execute the process in accordance with the condition, even without the operation, when the biological information indicates that the user is in a second specific psychological state.

20. A non-transitory computer readable medium storing a program causing a computer to execute a process comprising:
acquiring data, an instruction for a process in which the data are used, and biological information on a user who provides the instruction;
executing the process in a first time, when the biological information indicates that the user is not in a specific psychological state; and executing the process in a second time, when the biological information indicates that the user is in the specific psychological state, wherein the second time is shorter than the first time.

* * * * *